(No Model.) 2 Sheets—Sheet 1.
P. J. McELROY.
MULTIPLEX GLASS TUBE.
No. 481,805. Patented Aug. 30, 1892.
Fig. 1.
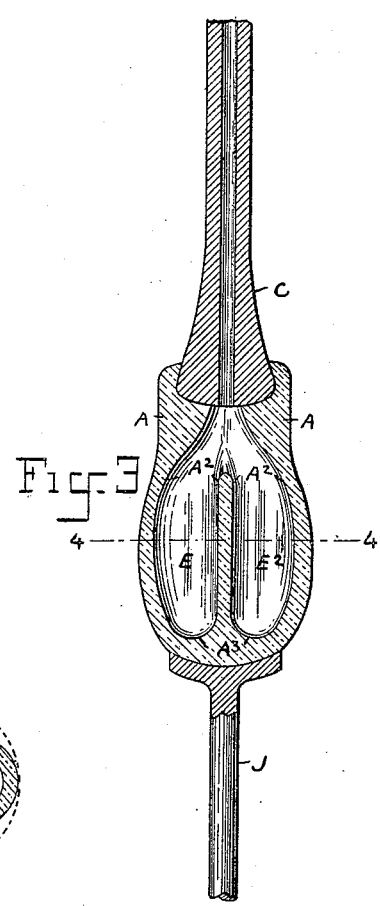
Fig. 3.
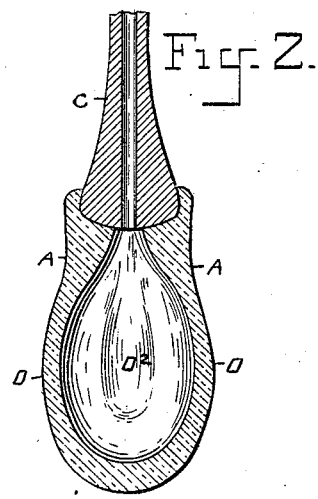
Fig. 2.
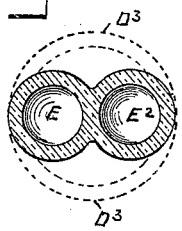
Fig. 4.
Fig. 8.
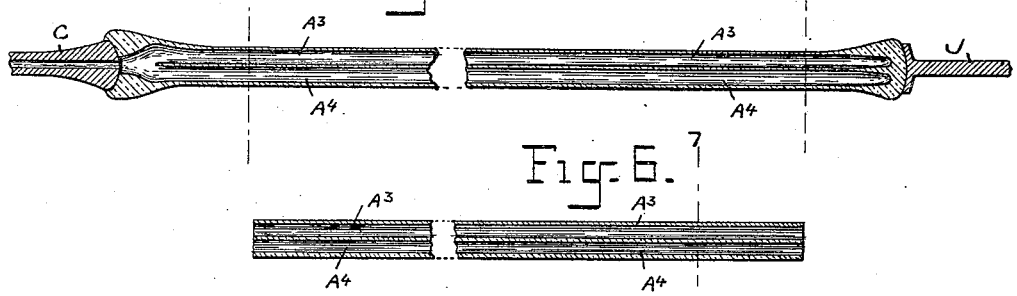
Fig. 5.
Fig. 6.
Witnesses.
Marion E. Brown
Mary A. Stoeer
Fig. 7.
Inventor:
Patrick J. McElroy
by his Attorneys
Brown Bro (No Model.) 2 Sheets—Sheet 2.
P. J. McELROY.
MULTIPLEX GLASS TUBE.
No. 481,805. Patented Aug. 30, 1892.
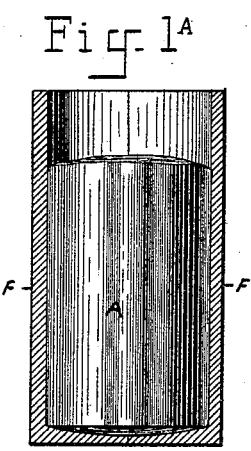
Fig. 1ᴬ
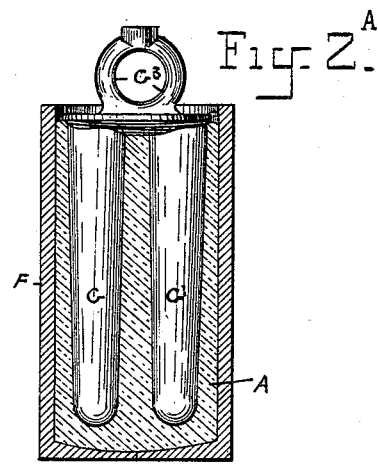
Fig. 2ᴬ
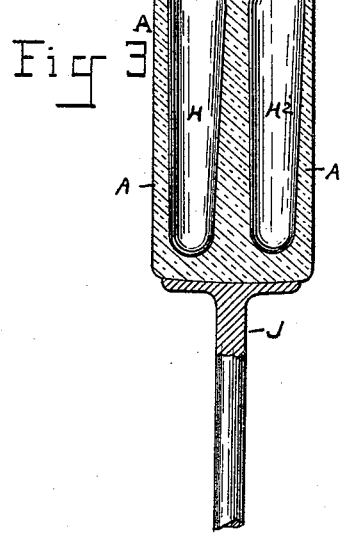
Fig. 3ᴬ
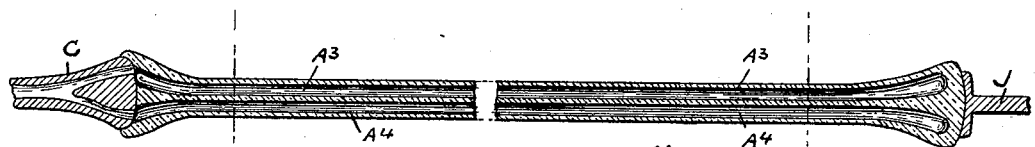
Fig. 4ᴬ
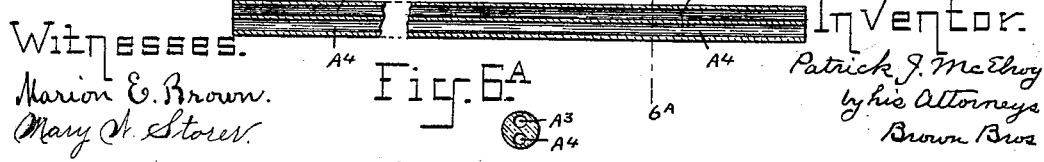
Fig. 5ᴬ
Fig. 6ᴬ
Witnesses.
Marion E. Brown.
Mary A. Storer.
Inventor.
Patrick J. McElroy
by his Attorneys
Brown Bros.
THE NORRIS PETERS CO., PHOTO-LITHO., WASHINGTON, D. C.

UNITED STATES PATENT OFFICE.

PATRICK J. McELROY, OF CAMBRIDGE, MASSACHUSETTS.

MULTIPLEX GLASS TUBE.

SPECIFICATION forming part of Letters Patent No. 481,805, dated August 30, 1892.

Application filed May 29, 1890. Serial No. 353,635. (No model.)

*To all whom it may concern:*

Be it known that I, PATRICK J. MCELROY, a citizen of the United States of America, and a resident of the city of Cambridge, in the county of Middlesex and State of Massachusetts, have invented a certain new and useful Improved Continuous Glass Tube, of which the following is a full, clear, and exact description.

This invention relates to glass tubing; and it consists of a continuous tube made of glass prepared first with separated chambers or cavities open at one end and then blown and distended simultaneously. For the manufacture of these tubes either one of the two ways to be hereinafter described or any other suitable way may be employed; but as to this the invention is not to be limited.

In the drawings forming part of this specification, Figures 1 and $1^A$ are each a side view of an ingot of glass. In Fig. 1 this ingot is in a mold shown in central vertical section. Fig. 2 is a vertical section showing the ingot, Fig. 1, as having a single chamber open at one end and closed at the other end and of a blowing-iron broken off and held on and in communication with said chamber at its said open end. Fig. $2^A$ is a vertical section of the mold and ingot, Fig. $1^A$, and a side view of two solid metal plungers or cores entered into the ingot, so that on their being withdrawn to leave in the ingot two molded distinct and separated chambers or cavities at one end open and at the other end closed. Figs. 3 and $3^A$ are each similar vertical sections of an ingot of glass having two distinct and separated chambers or cavities, both at one end open and at the other end closed, and of a blowing-iron broken off held on the ingot at said open end of its chambers, and of a punty or working rod held on the closed end of said ingot. Fig. 4 is a horizontal section, line 4 4, Fig. 3. Figs. 5 and $4^A$ are each central longitudinal sections of the chambered ingot, respectively, Figs. 3 and $3^A$, after each ingot has been further treated by a blowing-iron and a working rod in accordance with the method of this invention and before detaching said tools. Figs. 6 and $5^A$ are longitudinal sections similar to Figs. 5 and $4^A$, but with the blowing-irons and working rods removed and the extreme ends of the ingots, Figs. 5 and $4^A$, respectively, cut off and trimmed. Figs. 7 and $6^A$ are cross-sections, respectively on line 7 7, Fig. 6, and line $6^A$ $6^A$, Fig. $5^A$. Fig. 8 is a cross-section having four distinct and separated chambers in lieu of two, as shown in the figures of the drawings before explained.

In carrying out this invention the chambers or cavities B of the ingot A of glass can be made as follows, to wit: by first using a blowing-iron C, blowing the ingot A into a bulb D with a single chamber $D^2$, Fig. 2, and then joining the opposite side walls $D^3$ (dotted lines, Fig. 4) of the bulb-chamber $D^2$ and so making its said chamber into two separated and distinct chambers E $E^2$, Figs. 3 and 4, each at one end $A^2$ open and preferably at the other end $A^3$ closed; or again, by molding the glass in a mold F, Fig. $1^A$, into an ingot A and either at the same time or thereafter by inserting or forcing metal plungers or cores G $G^2$ into the glass in the mold forming in the ingot, as shown, Fig. $3^A$, (the plungers being removed,) two separated and distinct chambers or cavities H $H^2$, one for each plunger and each at one end open and preferably each at the other end closed. Preferably both plungers are attached to a common head $G^3$, suitably adapted to be conveniently handled.

Each of the chambered ingots described first is secured, Figs. 3 and $3^A$, at the open end of its said chambers to a blowing-iron C, suitable for communication by its air passage or passages with both chambers of the ingot, and it is also attached at the opposite end to one end of a punty or working rod J, and then by blowing or forcing air through the blowing-iron into said chambers, and simultaneously therewith by means of the punty the ingot is continuously drawn out and distended, all so that the ingot is reduced to a continuous length exteriorly of cylindrical or other such like form and interiorly with two distinct and separated and longitudinally continuous passages $A^3$ $A^4$, Figs. 5 and $4^A$, from which the tools, blowing-iron, and punty are removed. Preferably the tubes of Figs. 5 and $4^A$ on removal of the tools, as stated, are trimmed off in any suitable manner at their ends. (See Figs. 6 and 7 and Figs. $5^A$ and $6^A$.)

Obviously in the practice of this invention the ingots A, preparatory to being blown and distended, can be in either of the ways explained formed with more than two separated and distinct chambers E E$^2$—as, for instance, with four, Fig. 8—and from such an ingot the tube produced would have four continuous separate and distinct passages.

The ways herein particularly described for the manufacture of tubes of this invention constitute in substance a method in the manufacture of continuous glass tubes, embraced by a separate application, Serial No. 390,499, for Letters Patent of the United States, and they form no part of this invention.

The multiplex tube constructed according to my invention can readily be distinguished in the market from the multiplex tubes that are wrought into form by molding, in that said tube will be smooth upon its interior and exterior and of uniform size, whereas a multiplex molded tube, unless ground smooth, would be rough on its surface and has the presence of tapering longitudinally, for without such a taper being imparted to the tube it could not be withdrawn from the mold in which it is formed. The multiplex tube constructed according to my invention will also possess toughness and strength sufficient to resist extremes of temperature and is in a measure free from all liability to crack and break when exposed to either hot water or frost.

Having thus described my invention, what I claim, and desire to secure by Letters Patent, is—

A continuous tube made of glass prepared first with separated chambers or cavities open at one end and then blown and drawn simultaneously, substantially as and for the purposes herein described.

In testimony whereof I have hereunto set my hand in the presence of two subscribing witnesses.

PATRICK J. McELROY.

Witnesses:
 ALBERT W. BROWN,
 MARION E. BROWN.